(12) United States Patent
Chindapol et al.

(10) Patent No.: US 7,975,199 B2
(45) Date of Patent: Jul. 5, 2011

(54) RELAY-ASSISTED HARQ TRANSMISSION SYSTEM

(75) Inventors: Aik Chindapol, Princeton, NJ (US); Marija Milicevic, Belgrade (RS)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1007 days.

(21) Appl. No.: 11/772,295

(22) Filed: Jul. 2, 2007

(65) Prior Publication Data

US 2008/0049718 A1    Feb. 28, 2008

Related U.S. Application Data

(60) Provisional application No. 60/839,905, filed on Aug. 24, 2006.

(51) Int. Cl.
*H03M 13/00* (2006.01)
*H04L 1/18* (2006.01)
(52) U.S. Cl. ........................................ 714/751; 370/334
(58) Field of Classification Search .................. 714/749, 714/751; 370/334
See application file for complete search history.

(56) References Cited

U.S. PATENT DOCUMENTS

| 7,760,702 B2 * | 7/2010 | Deng et al. ................ 370/351 |
| 2007/0070954 A1 * | 3/2007 | Kim et al. ................. 370/334 |

FOREIGN PATENT DOCUMENTS

| WO | 2004002082 A1 | 12/2003 |
| WO | WO 2004/002082 A | 12/2003 |

OTHER PUBLICATIONS

Herhold et al. Cooperative multi-hop transmission in wireless networks, Computer Networks vol. 49 (2005), pp. 299-324,Jun. 1, 2005.*
DL and UL HARQ Method for RS Group by Bahceci et al. IEEE C802.16j-07/313r1 May 5, 2007.
Baum, Kevin, "Transparent Uplink Relaying for OFDMA", IEEE 802.16 Broadband Wireless Access Working Group (Aug. 18, 2004), pp. 1-8.
Cao, Yang, et al, "Cooperative Coding using Serial Concatenated Convolutional Codes", IEEE Wireless Communications and Networking Conference, vol. 2 (Mar. 17, 2005), pp. 1001-1006.
Hausl, Christoph, et al, "Iterative Network and Channel Decoding for the Two-Way Relay Channel", IEEE International Conference on Communications, ICC '06, vol. 4 (Jun. 2006), pp. 1568-1573.

(Continued)

*Primary Examiner* — Sam Rizk

(57) ABSTRACT

A method for transmitting data from a source to a destination. The method includes: transmitting the data from the source to both the destination and a relay station within a first transmission; decoding the data in the first transmitting at both the relay station and the destination wherein the destination acknowledges success of the decoding by generating a ACK message or lack of success by generating either a NACK message or by failing to generate the ACK signal; retransmitting from the source information related to the first transmission in response to either the NACK message or the failure of the destination to generate the ACK message; and wherein when the relay station decodes the data sent by the source within the first transmission correctly, the relay station transmits a second transmission; or, on the other hand, if the relay station is unable to decode the data correctly from the first transmission sent by the source, the relay station remains silent. The destination may be another relay station.

8 Claims, 4 Drawing Sheets

OTHER PUBLICATIONS

Herhold, Patrick, et al, "A Simple Cooperative Extension to Wireless Relaying", 2004 International Zurich Seminar on Communications (Aug. 24, 2004), pp. 36-39.

Sartori, Philippe J., "Improving the Uplink Data Rate of Portable Devices in Broadband Systems with Relaying", IEEE 62nd Vehicular Technology Conference, VTC-2005-Fall, vol. 4 (Sep. 28, 2005), pp. 2542-2546.

Souryal, Michael R., et al, "Cooperative Turbo Coding with Time-Varying Rayleigh Fading Channel", IEEE International Conference on Communications, vol. 1 (Jun. 24, 2004), pp. 356-360.

Zhao, B., et al, "Distributed turbo coded diversity for relay channel", Electronics Letters, vol. 39, Issue 10 (May 15, 2003), pp. 786-787.

Zhao, Bin, et al, "Practical Relay Networks: A Generalization of Hybrid-ARQ", IEEE Journal of Selected Areas in Communications, vol. 23, No. 1 (Jan. 2005), pp. 7-18.

Herhold P et al: Ä simple cooperative extension to wireless relaying Communications, 2004 International Zurich Seminare on Zurich, Switzerland Feb. 18-20, 2004, Piscataway, NJ, USA, IEEE, Feb. 18, 2004, pp. 36-39, XP010697662 ISBN: 0-7803-8329-X abstract *section I, II * figure 1.

* cited by examiner

RELAY-ASSISTED HARQ TRANSMISSION SYSTEM

CROSS REFERENCE TO RELATED APPLICATION

This application claims priority from U.S. Provisional application Ser. No. 60/839,905 filed on Aug. 24, 2006 which is incorporated herein by reference.

TECHNICAL FIELD

This invention relates generally to relay assisted HARQ transmission systems and method.

BACKGROUND

As is known in the art, the use of relays has been proven to be effective in transmitting data from the source to the destination where shadowing or large distance is a major concern. Recently distributed channel coding has been proposed to further increase the benefit of relaying by allowing a relay node to transmit partial codeword along with the direct transmission from the base station. See for example B Zhao and M. Valenti. Distributed turbo coded diversity for the relay channel. Electronic letters, 39:786; M. R. Souryal and B. R. Vojcic. Cooperative turbo coding with time-varying Rayleigh fading channels. Proc. IEEE ICC, pages 356-360, June 2004; and B. Zhao and M. Valenti. Practical relay networks: A generalization of Hybrid-ARQ, IEEE Journal on Selected Areas in Communications, 23(1):7-18, Jan. 2005.

The main idea of distributed channel coding is that devices in the network are able to cooperate in order to provide reliable communication. The destination receives better signal quality and achieves additional diversity by combining the information it receives from both source and relay. However conventional distributed channel coding schemes either require complex signaling for feedback between a relay node and the source or allow a relay node to forward erroneous information resulting in a performance loss.

More particularly FIG. 1 shows a typical relay scenario wherein data that has to be sent from the source (S) to the destination (D) is relayed via Relay Station (RS) where a gain is obtained since the relay station (RS) has a better link quality than the direct link between the source (S) and the destination (D) and FIG. 2 shows a typical distributed channel coding scenario, wherein an additional direct link is also used between the source (S) and destination (D) is also used. Within distributed channel coding scenario, the source (S) sends data to both relay station (RS) and destination (D) as the first transmission. After receiving data the RS decodes and forwards data to the destination (D) as the second transmission. The relay station (RS) can decode received data from the source (S) correctly or incorrectly.

As is also known in the art, relay systems with feedback, such as shown in FIG. 3 have been suggested, see for example, Y. Cao and B. Vojcic. Cooperative Coding using Serial Concatenated Convolutional Codes. IEEE Communications Society/WCNC 2005. In the relay with the feedback scheme as shown in FIG. 3, the source (S) sends data to both relay station (RS) and destination (D) within the first transmission. After receiving the data from the source (S), the relay station (RS) attempt to decode the data from the source (S) and sends acknowledgment back to the source (S) about the success. In cases where the source (S) is also the base station (BS), the source (S) is also responsible for allocating resources for transmission. Otherwise, the base station (BS), which is a central entity that controls the transmissions between the source and the destination, is responsible for allocating resources for transmissions and notifying both the Source (S) and the Destination (D) of such allocations. At this point there are two possible scenarios: First, if the relay station (RS) decodes the first transmission from the source (S) and the source (S) receives an acknowledgement (ACK) from the relay station (RS), the base station (BS) will allocate resources for the relay station (RS) to forward information to the destination (D); and Second, if the relay station (RS) is unable to decode the data from the source (S) sent in the first transmission correctly, the relay station (RS) will send negative acknowledgment (NACK) and inform the source (S) that retransmission is needed. Therefore, the source (S) retransmits information related to the first transmission to both the relay station (RS) and destination (D). That is, the retransmitted information contains the same amount of information as the message in the first transmission but the representation used in the retransmission may be different from that used in the original transmission. Depending on the type of retransmission scheme, the source (S) may retransmit the same packet (HARQ-Chase Combining) or it may retransmit additional redundancy compared with first transmission from the source (S) to the destination (D) (HARQ-Incremental Redundancy). In order to accommodate feedback between the relay station (RS) and the source (S), the base station (BS) needs to allocate additional bandwidth for transmission of ACK messages and the relay station (RS) needs to process the data unit very quickly in order to send ACK in time.

SUMMARY

In accordance with the present invention, method is provided for transmitting data from a source to a destination. The method includes: transmitting the data from the source to both the destination and a relay station within a first transmission; decoding the data in the first transmitting at both the relay station and the destination wherein the destination acknowledges success of the decoding by generating a ACK message or lack of success by generating either a NACK message or by failing to generate the ACK signal; retransmitting from the source information related to the first transmission in response to either the NACK message or the failure of the destination to generate the ACK message; and wherein when the relay station decodes the data sent by the source within the first transmission correctly, the relay station transmits a second transmission; or, on the other hand, if the relay station is unable to decode the data correctly from the first transmission sent by the source, the relay station remains silent.

The destination can be another relay station.

'In one embodiment, a method is provided for transmitting data from a source to a destination. The method includes: transmitting the data from the source to both the destination and a relay station within a first transmission; decoding the data in the first transmitting at both the relay station and the destination wherein the destination acknowledges success of the decoding by generating a ACK message or lack of success by generating either a NACK message or by failing to generate the ACK signal; retransmitting from the source, information related to the first transmission in response to either the NACK message or the failure of the destination to generate the ACK message; and wherein when the relay station decodes the data sent by the source within the first transmission correctly, the relay station transmits a second transmission simultaneously with the source; or, on the other hand, if the relay station is unable to decode the data correctly from the first transmission sent by the source, the relay station remains silent and listens again to the retransmission from the source to the destination.

In one embodiment, the method includes: transmitting the data from the source to both the destination and a plurality of relay stations within a first transmission; decoding the data in the first transmitting at both the plurality of relay stations and the destination wherein the destination acknowledges success of the decoding by generating a ACK message or lack of success by generating either a NACK message or by failing to generate the ACK signal; retransmitting from the source information related to the first transmission in response to either the NACK message or the failure of the destination to generate the ACK message; and wherein when at least one of the plurality of relay stations decodes the data sent by the source within the first transmission correctly, such at least one of the relay stations transmits a second transmission; or, on the other hand, if said at least one of the relay stations is unable to decode the data correctly from the first transmission sent by the source, said at least one of the relay stations remains silent.

When more than one relay are involved, the source transmits the data to the destination and all participating relay stations. The destination and all relays decode the data in the first transmission. The destination determines whether the decoding was successful, and, if successful, acknowledges success of the decoding by generating a ACK message; on the other hand, if the decoding was not successful at the destination or the message was not received, the destination generates either an NACK message or fails to generate the ACK signal wherein the source retransmits information related to the first transmission. At each relay station, it determines whether it can decode the data sent by the source within the first transmission correctly. If decoded successfully, the relay station transmits a second transmission simultaneously with the source and other relays that receive the data correctly; on the other hand, if the relay station determines that it did not decode the data sent by the source within the first transmission correctly, the relay station remains silent and listens again to the retransmission from the source or other relays that receive the data correctly and transmit the data simultaneously to the destination given that relay station already knows what it needs to do because of the feedback link between the relay station and the source.

With such method, if the relay station is unable to decode the data from the source correctly and the data is not forwarded from the relay station to the destination, the destination will still receive the second transmission directly from the source. Furthermore, if the destination is still unable to decode data after retransmission from the source, the relay station can forward overheard data as a third transmission.

With such method, feedback channels are not required between a relay node and a source while still achieving similar performance as methods having feedback. This is achieved by having relays listen to the broadcast messages containing locations of allocated resources from the source (e.g., a base station (BS). Further, the method is transparent to the destination, meaning that the destination is unaware of a relayed transmission. Still further complexity is not introduced into existing HARQ systems, since the distributed channel coding can be inherently realized with the existing HARQ equipments.

More particularly, a method is provided for overcoming the impact of fading within a communication system with relays. The method uses relay-assisted HARQ transmission with distributed channel coding scheme in order to assure reliable communication between end nodes (i.e., source and destination); however, the method does not require additional bandwidth in the event that the relay station is unable to decode the data from the source. Furthermore, no complexity is introduced into the system, since the method is transparent to the destination in the sense that the destination is unaware that one transmission is being relayed and can be implemented within existing standard mechanisms such as HARQ without further complexity. That means, if the destination sends negative acknowledgment (NACK) to the source due to the erroneous decoding or not receiving a packet, the base station will implicitly organize joint second transmission from the relay station, or the plurality of relay stations and retransmission from the source to the destination.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
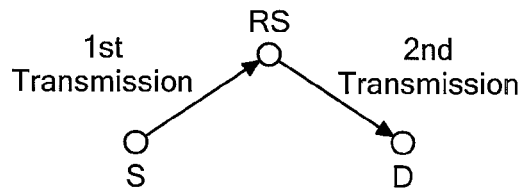
FIG. 1 is a simple relaying system according to the PRIOR ART.
Figure 2:
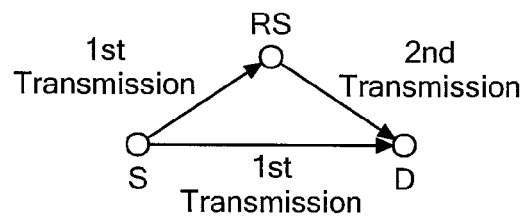
FIG. 2 is a typical distributed channel coding system according to the PRIOR ART.
Figure 3:
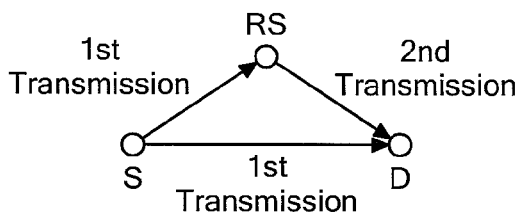
FIG. 3 is a relay system with feedback according to the prior art.
Figure 4:
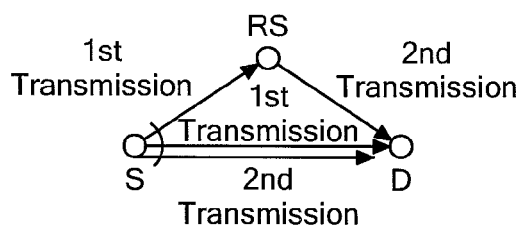
FIG. 4 is Relay-Assisted HARQ transmission system with Distributed Channel Coding according to the invention.
Figure 8:
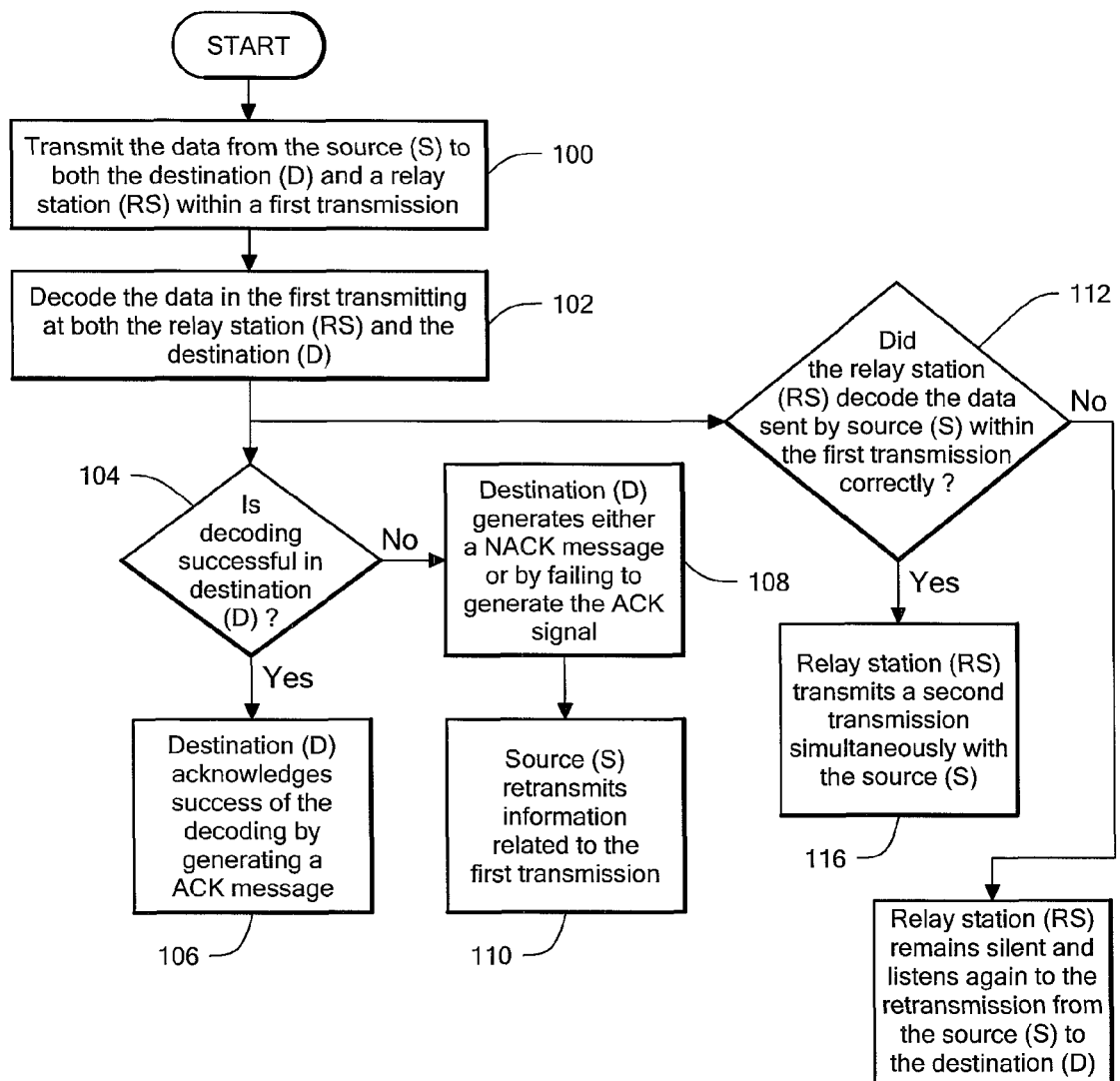
FIG. 8 is a flow chart of the operation of the Relay-Assisted HARQ transmission system with Distributed Channel Coding of FIG. 4 according to the invention.

Referring now to FIGS. 4 and 8, a source (S), such as a base station, sends data to both relay station (RS) and destination (D), such as a mobile station, within a first transmission. After receiving the data from the source (S), the relay station (RS) and the destination (D) attempt to decode the data and the destination (D) acknowledge success of the decoding. If the retransmission is needed, via NACK message or the lack of ACK, the source (S) retransmits information related to the first transmission. That is, the retransmitted information contains the same information as the message in the first transmission but the representation used in the retransmission may be different from that used in the original transmission. For the relay station (RS), there are two possible scenarios. First, if the relay station (RS) decodes the data sent by the source (S) within the first transmission correctly, it, the relay station, transmits the second transmission simultaneously with the source (S). Second, if the relay station (RS) is unable to decode the data correctly from the first transmission send by the source (S), the relay station (RS) will remain silent and listens again to the retransmission from the source (S) to the destination (D). Therefore, if the relay station (RS) is unable to decode the data from the source (S) correctly and the data is not forwarded from the relay station (RS) to the destination (D), the destination (D) will still receive the second transmission directly from the source. In the first scenario, the source (S) and the base station (BS) do not expect any feedback from the relay station (RS) and the base station schedules retransmission assuming the destination (D) receives retransmission either from the source (S) or from both source (S) and relay station (RS) simultaneously. The relay station (RS) learns about the second transmission via either an explicit message from the base station or implicit information included in the first transmission. Furthermore, if the destination (D) is still unable to decode data after retransmission from the source (S), the relay station (RS) can forward overheard data as a third transmission.

Thus, as shown in FIG. 8, the system transmits the data from the base station to both the destination (D) and a relay stations (RS) within a first transmission, Step 100. Both the relay station (RS) and the source (S) decode the data in the first transmission, Step 102. At the destination (D): The destination (D) determines whether the decoding was successful, Step 104. If the decoding was successful, the destination (D) acknowledges success of the decoding by generating an ACK message, Step 106. On the other hand, if the decoding was not successful at the destination, the destination (D) generates either a NACK message or fails to generate the ACK signal, Step 108, and then the source (S) retransmits information related to the first transmission, Step 110.

At the relay station (RS): The relay station (RS) determines whether the relay station (RS) decodes the data sent by the source (S) within the first transmission correctly, Step 112. If it was decoded correctly within the first transmission, the relay station (RS) transmits a second transmission simultaneously with the source (S), Step 116. On the other hand, if the relay station (RS) determines that it, the relay station (RS) did not decode the data sent by the source (S) within the first transmission correctly, then it, the relay station, remains silent and listens again to the retransmission from the source (S) to the destination (D), Step 114.

Figure 5:
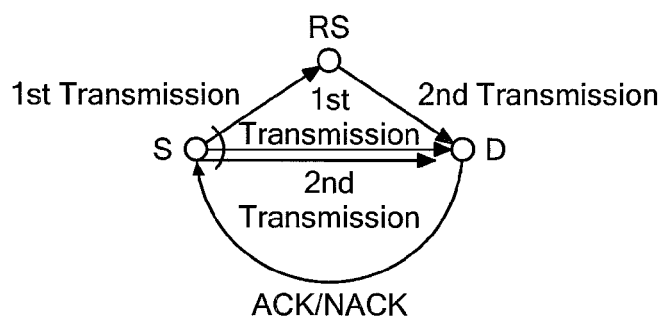
FIG. 5 is a system having Joint distributed channel coding and direct retransmission from a base station according to the invention.

In order to implement scenario of joint distributed channel coding and direct retransmission from the source (S), no additional complexity is introduced. First, the scenario as shown in FIG. 5 could be implemented with HARQ mechanisms that already exist in many standards such as the IEEE 802.16 standard. That way, the protocol is transparent to the destination (D) since the destination (D) is unaware that one transmission is being relayed. Furthermore, no complexity is introduced to the system since the acknowledgment process remains between the two end nodes, namely the source and the destination. That means, if the destination (D) sends negative acknowledgment (NACK) to the base station (BS) due to the erroneous decoding or not receiving a packet, the base station (BS) will organize joint second transmission from the relay station (RS) and retransmission from the source (S) to the destination (D).

When more than one relay station is involved, the source transmits the data to the destination and all participating relay stations. The destination and all relay stations decode the data in the first transmission. The destination determines whether the decoding was successful, and, if successful, acknowledges success of the decoding by generating a ACK message; on the other hand, if the decoding was not successful at the destination or the message was not received, the destination generates either an NACK message or fails to generate the ACK signal wherein the source retransmits information related to the first transmission. At each relay station, such relay station determines whether it can decode the data sent by the source within the first transmission correctly. If decoded successfully, the relay station transmits a second transmission simultaneously with the source and other relays that receive the data correctly; on the other hand, if the relay station determines that it did not decode the data sent by the source within the first transmission correctly, the relay station remains silent and listens again to the retransmission from the source or other relays that receive the data correctly and transmit the data simultaneously to the destination. The relay station may look for allocations of retransmissions from the source in order to either perform joint retransmission or listen to the retransmission without an explicit instruction from the base station.

Figure 9:
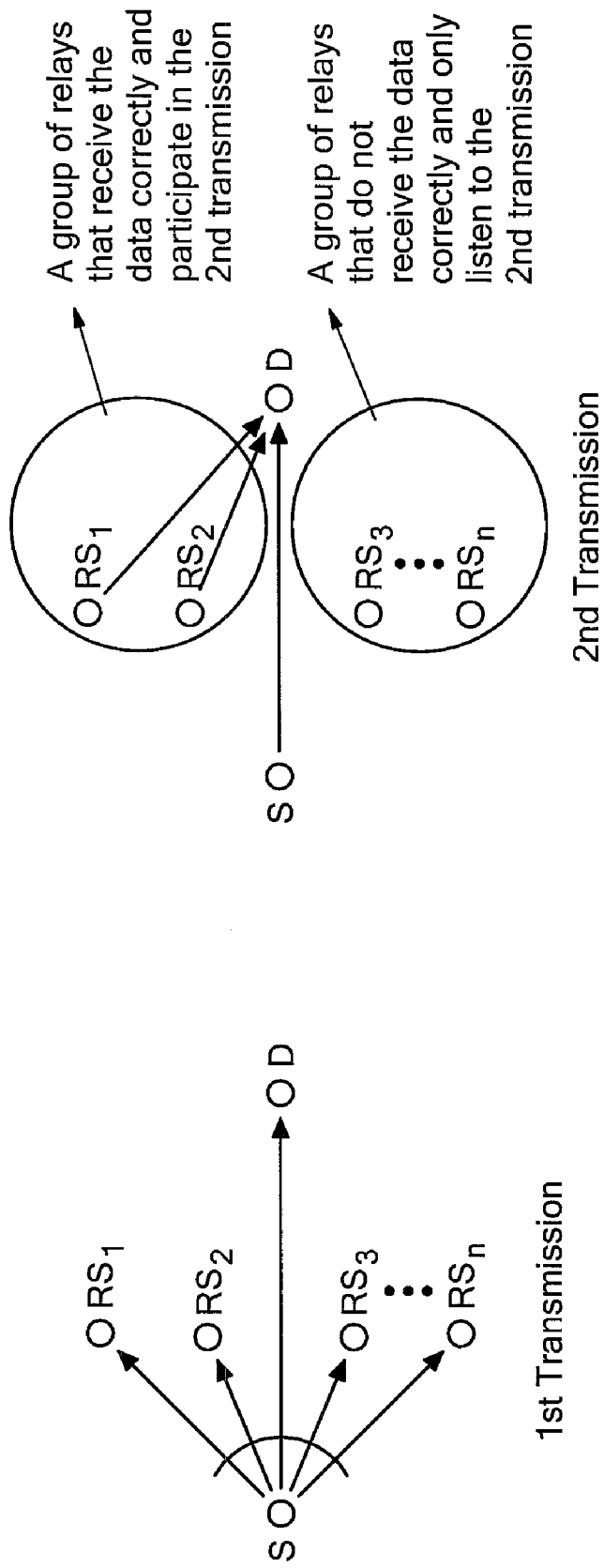
FIG. 9 is a system according to an embodiment of the invention wherein a source (S) transmits a first transmission to destinations (D) and all participating Relay Stations (RS) and wherein two groups of the Relay Stations (RS) either participates in a second transmission or only listens to the second transmission.

Referring now to FIG. 9 the source (S) transmits the first transmission, as shown in the left side portion of FIG. 9, to the destination (D) and all participating Relay Stations (RS) shown as $RS_1, RS_2, RS_3, \ldots, RS_n$. After decoding the data, only a group of Relay Stations (RS) that are able to decode the message correctly transmit the data to the destination along with the Source (S) in the second transmission. All other relay stations that do not decode the message correctly do not transmit anything and listens to the second transmission from the Source (S) or other Relay Station (RS). The right hand side of FIG. 9 illustrates the two groups of Relay Stations that either participates in the second transmission or only listens to the second transmission. Given that it is possible that more than one station, the source and one or more relays, may participate in the second transmission, the Base Station (BS) may explicitly choose a subset of stations to participate in the second transmission.

Thus, here the method includes: transmitting the data from the source to both the destination and a plurality of relay stations within a first transmission; decoding the data in the first transmitting at both the plurality of relay stations and the destination wherein the destination acknowledges success of the decoding by generating a ACK message or lack of success by generating either a NACK message or by failing to generate the ACK signal; retransmitting from the source information related to the first transmission in response to either the NACK message or the failure of the destination to generate the ACK message; and wherein when at least one of the plurality of relay stations decodes the data sent by the source within the first transmission correctly, such at least one of the relay stations transmits a second transmission; or, on the other hand, if said at least one of the relay stations is unable to decode the data correctly from the first transmission sent by the source, said at least one of the relay stations remains silent.

It is noted that wherein when the relay station decodes the data sent by the source within the first transmission correctly, the relay station may transmits a second transmission simultaneously with the source. Further, if the relay station is unable to decode the data correctly from the first transmission sent by the source, the relay station remains silent and listens again to the retransmission from the source to the destination. Still further, one of the relay stations may be considered as a destination.

Figure 6:
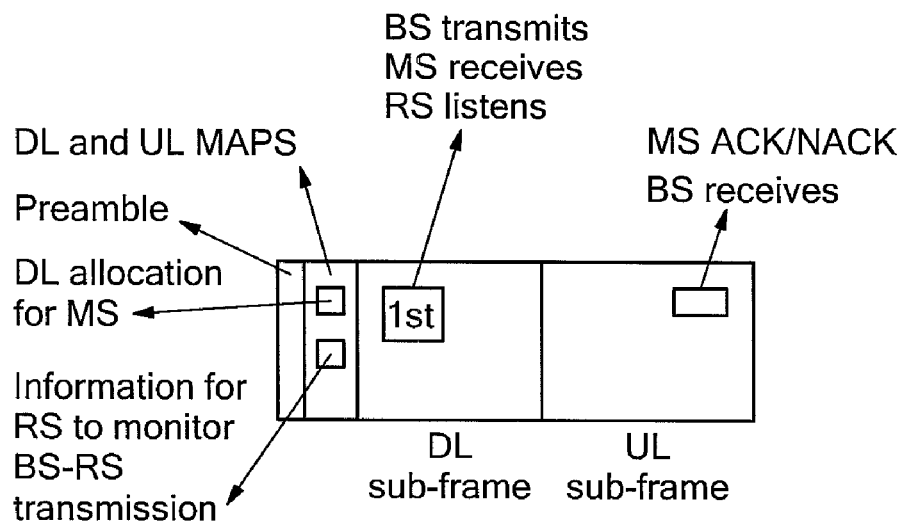
FIG. 6 is a structure of a first frame transmitted in the system of FIG. 5.

For better understanding, an example of the organization of proposed scheme as applied to the downlink of the IEEE 802.16 system, where the source (S) also performs the function of the base station (BS) and only one relay station (RS) participate in the relay-assisted HARQ transmissions, in timely manner is described in following paragraph. Depending on network configurations, the source (S) and the base station (BS) may be two different entities. The frame structure of the first time frame illustrating how the base station (BS) could allocate resources is shown in FIG. 6.

The base station (BS) assigns downlink (DL) resources via DL MAP, which indicates the mapping of allocated resources from the source to the destination (D) or the plurality of destinations, and the base station (BS) inform the relay station (RS) to listen to particular transmission.

The source (S) sends data to the destination (D) and instructs the relay station (RS) to listen for a particular transmission.

The relay station (RS) and the destination (D) attempt to decode the data sent by the source (S).

The destination (D) acknowledges success of decoding. The base station (BS) assigns resources for the destination (D) to transmit an acknowledgement via UL MAP, which indicates the mapping of allocated resources from the destination or the plurality of destinations to the source. It is to be noted that it is not necessary for the relay station (RS) to acknowledge transmissions.

Figure 7:
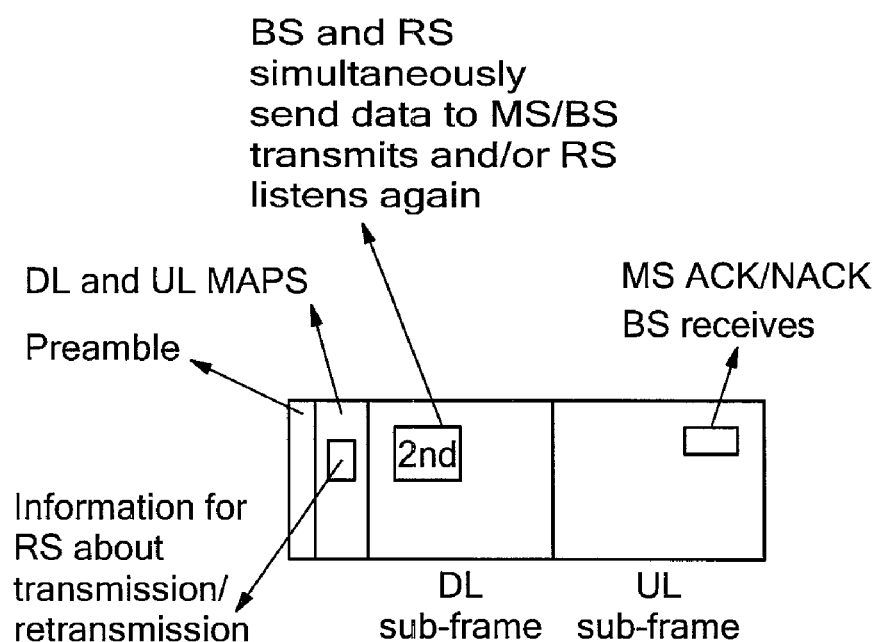
FIG. 7 is a structure of a second frame transmitted in the system of FIG. 5.

In the case that MS sends NACK to the source (S) due to erroneous decoding or fails to send ACK to the source (S) after not receiving data, and the relay station (RS) is able to correctly decode the data from the source (S), the relay station (RS) will retransmit data to the destination (D) simultaneously with the source (S) as shown in FIG. 7. In this case, the base station (BS) assigns DL resources via the DL MAP to the source (S) and instructs the relay station (RS) to retransmit correctly received data. The relay station (RS) may look for allocations of retransmissions from the source (S) and retransmit simultaneously without any explicit instructions from the source (S) or the base station (BS).

In the case that destination (D) sends NACK to the source (S) or fails to send ACK to the source (S) after not receiving data, but the relay station (RS) is unable to decode data from the source (S) correctly, only the source (S) retransmits data to the destination (D) and the relay station (RS) remains silent and also listens to the retransmission from the source (S). In this case, the base station (BS) assigns DL resources via DL MAP to the source (S) and the destination (D). Although the relay station (RS) may be instructed to retransmit correctly received data, the relay station (RS) in this case ignores the instructions from the source (S), remains silent and listens to retransmission from the source (S) instead. The relay station (RS) may look for allocations of retransmissions from the source (S) and listen to the retransmission without any explicit instructions from the source (S) or the base station (BS).

Therefore, if the relay station (RS) is unable to decode the data from the source (S) correctly and the data is not forwarded from the relay station (RS) to the destination (D), the destination (D) still receives the second transmission directly from the source (S). Furthermore, if the destination (D) is still unable to decode data after retransmission from the source (S), the relay station (RS) can forward overheard retransmission as a third transmission to the destination (D).

A number of embodiments of the invention have been described. Nevertheless, it will be understood that various modifications may be made without departing from the spirit and scope of the invention. Accordingly, other embodiments are within the scope of the following claims.

What is claimed is:

1. A method for transmitting data from a base station to a destination, comprising:
   transmitting the data from the base station to both the destination and a relay station within a first transmission;
   decoding the data in the first transmitting at both the relay station and the destination wherein the destination acknowledges success of the decoding by generating a ACK message or lack of success by generating either a NACK message or by failing to generate the ACK signal;
   retransmitting from the base station information related to the first transmission in response to either the NACK message or the failure of the destination to generate the ACK message; and
   wherein when the relay station decodes the data sent by the base station within the first transmission correctly, the relay station transmits a second transmission; or, on the other hand, if the relay station is unable to decode the data correctly from the first transmission sent by the base station, the relay station remains silent.

2. The method recited in claim 1 wherein the destination is another relay station.

3. A method for transmitting data from a base station to a destination, comprising:
   transmitting the data from the base station to both the destination and a relay station within a first transmission;
   decoding the data in the first transmitting at both the relay station and the destination wherein the destination acknowledges success of the decoding by generating a ACK message or lack of success by generating either a NACK message or by failing to generate the ACK signal;
   retransmitting from the base station, information related to the first transmission in response to either the NACK message or the failure of the destination to generate the ACK message; and
   wherein when the relay station decodes the data sent by the base station within the first transmission correctly, the relay station transmits a second transmission simultaneously with the base station; or, on the other hand, if the relay station is unable to decode the data correctly from the first transmission sent by the base station, the relay station remains silent and listens again to the retransmission from the base station to the destination.

4. The method recited in claim 3 wherein the destination is another relay station.

5. A method for transmitting data from a base station to a destination, comprising:
   transmitting the data from the base station to both the destination and a plurality of relay stations within a first transmission;
   decoding the data in the first transmitting at both the plurality of relay stations and the destination wherein the destination acknowledges success of the decoding by generating a ACK message or lack of success by generating either a NACK message or by failing to generate the ACK signal;
   retransmitting from the base station information related to the first transmission in response to either the NACK message or the failure of the destination to generate the ACK message; and
   wherein when at least one of the plurality of relay stations decodes the data sent by the base station within the first transmission correctly, such at least one of the relay stations transmits a second transmission; or, on the other hand, if said at least one of the relay stations is unable to decode the data correctly from the first transmission sent by the base station, said at least one of the relay stations remains silent.

6. The method recited in claim 5 wherein the destination is one of the plurality of relay stations.

7. A method for transmitting data from a base station to a destination, comprising:
- transmitting the data from the base station to both the destination and a relay station within a first transmission;
- decoding the data in the first transmission in both the relay station and the destination;
- at the destination:
  - determining whether the decoding was successful;
  - if successful, acknowledging success of the decoding by generating a ACK message;
  - on the other hand, if the decoding was not successful at the destination, generating either a NACK message or fail to generate the ACK signal wherein the base station retransmits information related to the first transmission;
- at the relay station:
  - determining whether the relay station decodes the data sent by the base station within the first transmission correctly;
  - if decoded successfully, transmitting a second transmission simultaneously with the retransmitted information related to the first transmission;
  - on the other hand, if the relay station determines that the relay station did not decode the data sent by the base station within the first transmission correctly, having the relay station remain silent and listens again to the retransmission of the information relayed to the first transmission from the base station to the destination.

8. The method recited in claim 7 wherein the destination is another relay station.

* * * * *

UNITED STATES PATENT AND TRADEMARK OFFICE
CERTIFICATE OF CORRECTION

| | | |
|---|---|---|
| PATENT NO. | : 7,975,199 B2 | Page 1 of 1 |
| APPLICATION NO. | : 11/772295 | |
| DATED | : July 5, 2011 | |
| INVENTOR(S) | : Aik Chindapol et al. | |

It is certified that error appears in the above-identified patent and that said Letters Patent is hereby corrected as shown below:

On the first page, in field (60), under "Related U.S. Application Data", in column 1, line 2, delete "2006." and insert -- 2006 and Provisional application No. 60/788,815, filed on Apr. 3, 2006. --, therefor.

Signed and Sealed this
Eighth Day of November, 2011

David J. Kappos
*Director of the United States Patent and Trademark Office*